(12) United States Patent
Wu

(10) Patent No.: US 6,765,788 B2
(45) Date of Patent: Jul. 20, 2004

(54) METHOD AND APPARATUS FOR INTEGRATING PERSONAL COMPUTER AND ELECTRONIC DEVICE FUNCTIONS

(75) Inventor: Chia-Chuan Wu, Kaohslung (TW)

(73) Assignee: Mitac Technology Corp., Hsien (TW)

( * ) Notice: Subject to any disclaimer, the term of this patent is extended or adjusted under 35 U.S.C. 154(b) by 0 days.

(21) Appl. No.: 10/352,676

(22) Filed: Jan. 28, 2003

(65) Prior Publication Data

US 2004/0090738 A1 May 13, 2004

(30) Foreign Application Priority Data

Nov. 12, 2002 (TW) .......................................... 91133178 A (51) Int. Cl.⁷ .............................................. G06F 1/16
(52) U.S. Cl. .................... 361/680; 312/223.2; 345/854; 400/88
(58) Field of Search ................................. 361/679–687; 312/223.1–223.6; 345/716–723, 854; 400/88

(56) References Cited

U.S. PATENT DOCUMENTS

| | | | | |
|---|---|---|---|---|
| 6,256,193 B1 | * | 7/2001 | Janik et al. | 361/683 |
| 2003/0115384 A1 | * | 6/2003 | Sonehara et al. | 710/10 |
| 2004/0037035 A1 | * | 2/2004 | Ohashi et al. | 361/687 |

* cited by examiner

*Primary Examiner*—Hung Van Duong
(74) *Attorney, Agent, or Firm*—Quintero Law Office (57) ABSTRACT

An apparatus and a method for integrating personal computer and electronic device functions. An integrated keyboard, personal computer host, and keyboard encoder in turn integrate hardware, operating system, and application programs to provide personal computer and electronic device functions at the same time.

10 Claims, 2 Drawing Sheets

METHOD AND APPARATUS FOR INTEGRATING PERSONAL COMPUTER AND ELECTRONIC DEVICE FUNCTIONS

BACKGROUND OF THE INVENTION

1. Field of the Invention

The present invention relates to a personal computer integration technology, and in particular to an apparatus and a method for integrating personal computer and electronic device functions.

2. Description of the Related Art

Presently, personal computers feature powerful computing capability and a wide range of multimedia capabilities. Integrating personal computer and electronic device functions has become an important priority in the personal computer industry. However, there exist problems in integrating personal computer and electronic device functions.

One challenge is to provide an integrated interface, such as an integrated keyboard. In addition, the information and text conventionally appearing in the display accompanying the power-up procedures of the personal computer are complex and overly technical in the integrated mode. Finally, personal computer hardware dedicated to integration of this type is costly and cannot fully satisfy user requirements.

SUMMARY OF THE INVENTION

Accordingly, an object of the invention is to provide a method and apparatus for integration of hardware, operating system, and application programs. Using an integrated interface, such as an integrated keyboard, the personal computer can maintain its original powerful functions while enabling electronic device function.

Another object of the invention is to provide a customized BIOS to improve power-up procedures to make integrate them with electronic device function.

To achieve the present objects, the invention discloses an apparatus for integrating personal computer and electronic device functions, comprising an integrated keyboard, a personal computer host, and a keyboard encoder.

The integrated keyboard includes dedicated personal computer and electronic device function hot keys. The personal computer hot key enables a standard personal computer mode. Electronic device function hot keys enable electronic device mode. Electronic device function hot keys are provided by adding extra keys to a standard keyboard layout or by assigning existing keys to function on a standard keyboard as hot keys.

The integrated keyboard can be designed specifically for personal computer integration with electronic device functions such as DVD, VCD, CD, MP3, TV, VCR and Radio. Alternatively, the integrated keyboard can be enabled by assigning existing keys to function on a standard keyboard as electronic device function hot keys, eliminating the need for extra keys on a standard keyboard.

The personal computer host includes a customized BIOS and electronic device application programs. The customized BIOS executes power-up procedures in electronic device mode. If the hot key used is the personal computer function hot key, the personal computer host enters personal computer mode and standard follow-up steps of the power-up procedure follow. Thus, standard personal computer functions are provided, irrespective of mode employed. For electronic device function, the personal computer host enters electronic device mode and the follow-up steps of power-up procedures are performed by the customized BIOS, in which power-up procedures are accompanied by graphics and text matching electronic device function.

Electronic device application programs execute electronic device function according to keys used and registered by the keyboard encoder. As an example, if the DVD/VCD hot key is used, electronic device application programs execute DVD/VCD function. If the FM/Radio hot key is used, electronic device application programs execute FM/Radio function. Electronic device application programs are provided by any computer-executable program language, such as C, C++. As given above, electronic device functions are enabled without affecting the original personal computer functions, accomplishing a major aim of the invention.

The keyboard encoder is coupled with the personal computer host, and the integrated keyboard. The keyboard encoder produces code corresponding to the hot key used in the integrated keyboard, and sends the corresponding code to the personal computer host.

In addition, the invention discloses a method for integrating personal computer and electronic device functions. First, an integrated keyboard, personal computer host, and keyboard encoder are provided. The integrated keyboard includes dedicated personal computer and electronic device function hot keys. The personal computer host, comprising customized BIOS and electronic device application programs, executes the personal computer functions and electronic device function. The keyboard encoder, coupled with the personal computer hoot, and the integrated keyboard, produces corresponding code from hot keys used.

Using a hot key, with the personal computer in off or standby mode enables the personal computer host. The keyboard encoder produces the corresponding code according to the hot key used and sends the corresponding code to the personal computer host.

The personal computer host then determines whether the hot key used is the personal computer function hot key or electronic device function hot key according to the corresponding code, and, accordingly, enters personal computer mode, executing standard personal computer functions, or electronic device mode, initiating electronic device application programs to execute electronic device function.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
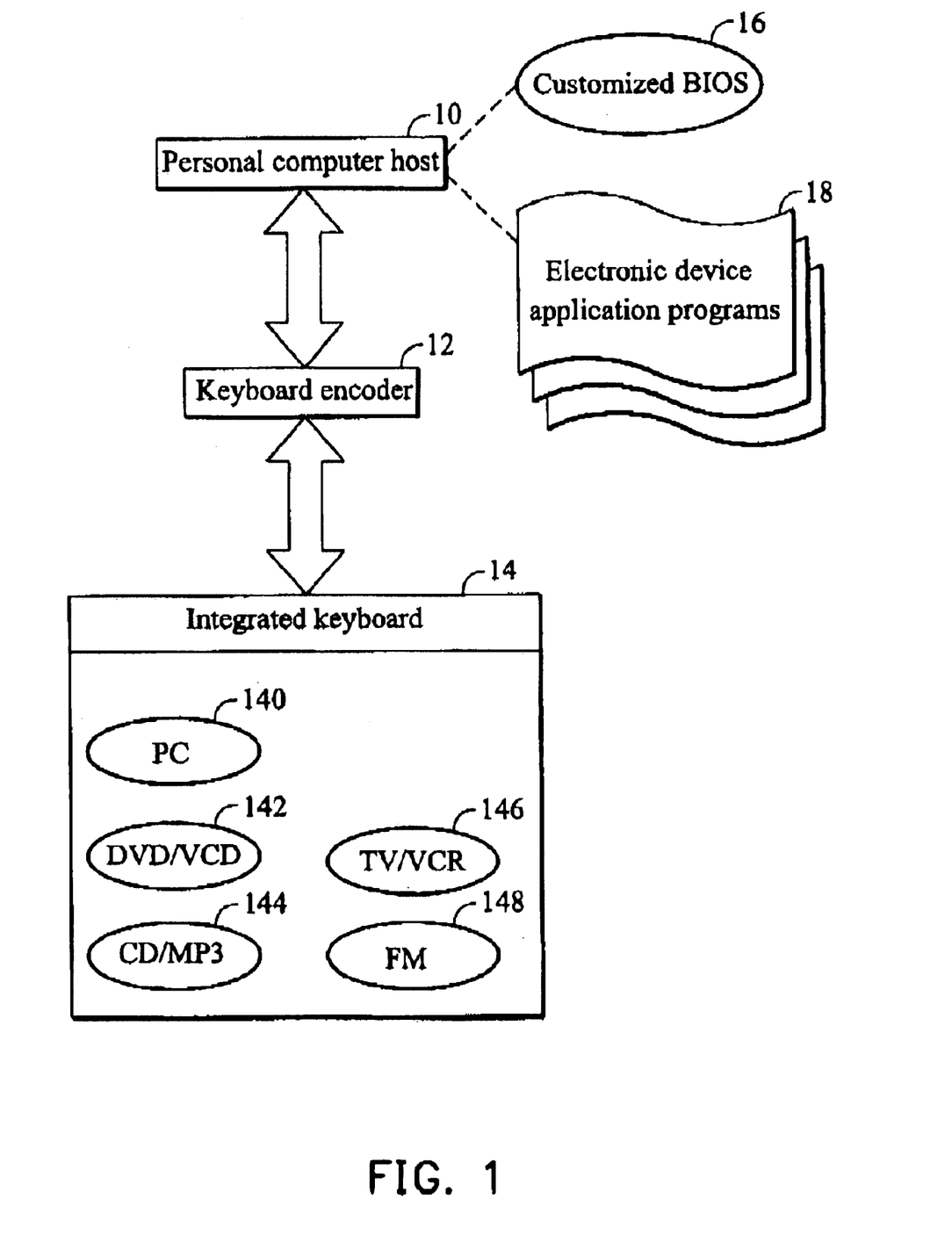
FIG. 1 is a diagram of the apparatus for integrating personal computer and electronic device functions.

FIG. 1 is a diagram of the apparatus for integrating personal computer and electronic device functions. The invention discloses an apparatus comprising an integrated keyboard 14, a personal computer host 10, and a keyboard encoder 12.

The integrated keyboard 14 includes a personal computer function hot key 140 and electronic device function hot keys. The diagrammed electronic device function hot keys include DVD/VCD hot key 142, CD/MP3 hot key 144, TV/VCR hot key 146, and FM/Radio hot key 148, although the inventive apparatus and method can encompass any applied electronic device functions. The personal computer function hot key 140 enables the personal computer mode, providing the personal computer functions. Electronic device function hot keys are provided by adding dedicated keys to a standard keyboard layout, or by assigning existing keys to function as the hot keys in a standard keyboard.

The personal computer host 10 includes a customized BIOS 16 and electronic device application programs 18. The customized BIOS 16 executes power-up procedures in electronic device mode. Electronic device application programs 11 execute electronic device functions in electronic device mode, according to the hot keys used and registered by the keyboard decoder 12. The DVD/VCD hot key 142, for example, instructs the personal computer host to initiate the corresponding electronic device programs 18 and execute DVD/VCD function. Like key use for other functions enables like activation of corresponding devices. Electronic device application programs 18 are provided by any computer-executable program language, such as C, C++.

The keyboard encoder 12 is coupled with the personal computer host 10 and the integrated keyboard 14. The keyboard encoder 12 produces a corresponding code when activated by a hot key in the integrated keyboard 14, and sends the corresponding code to the personal computer host 10.

Figure 2:
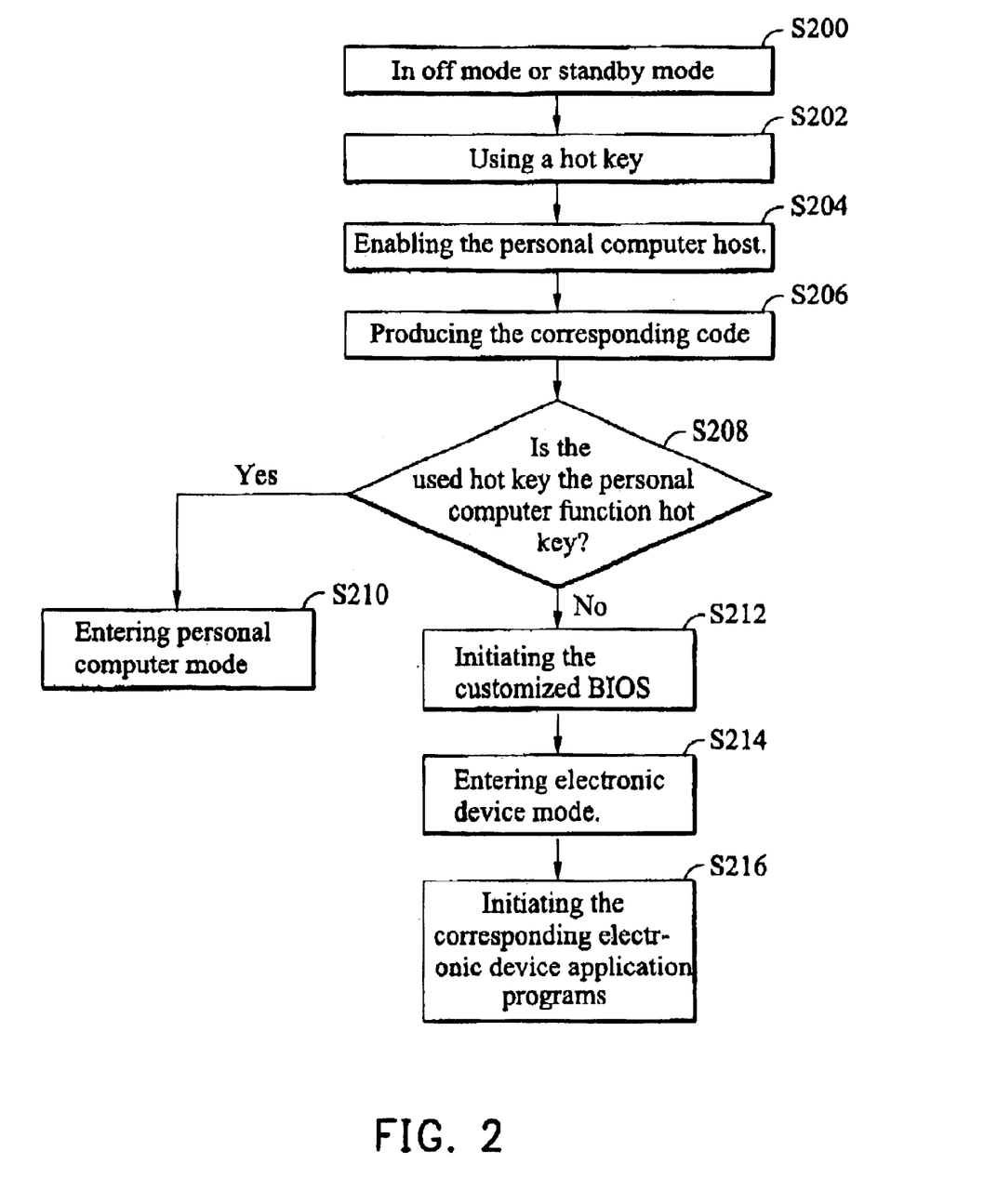
FIG. 2 is a flowchart of the method for integrating personal computer and electronic device functions.

FIG. 2 is a flowchart of the method for integrating personal computer and electronic device functions. First, an integrated keyboard, personal computer host, and keyboard encoder are provided. The integrated keyboard includes dedicated personal computer and electronic device function hot keys. Electronic device function hot keys are provided by adding dedicated keys to a standard keyboard layout or by assigning existing keys to function as hot keys on a standard keyboard. The personal computer host includes a customized BIOS and electronic device application programs. The personal computer host executes both personal computer and electronic device functions. Electronic device function programs are provided by any computer-executable program language. Electronic device application programs execute electronic device function according to the hot key used and registered by the keyboard encoder. The keyboard encoder is coupled with the personal computer host and the integrated keyboard. The keyboard encoder produces the corresponding code according to the key used.

A hot key on the integrated keyboard is used with the computer system in off or standby mode (S200, S202) and the hot key used enables the personal computer host (S204). The personal computer and electronic device function hot keys provide corresponding functionalities, respectively, such that, when enabled, the personal computer host enters power-up mode from off or standby mode.

The keyboard encoder identifies the hot key used, produces the corresponding code (S206), and sends the corresponding code to the personal computer host. The personal computer host then determines whether the hot key used is the personal computer function hot key or the electronic device function hot key according to the corresponding code (S208). If the personal computer function hot key is used, the personal computer host enters personal computer mode and executes personal computer functions (S210). If the electronic device function hot key is used, the personal computer host initiates the customized BIOS (S212) and enters electronic device mode (S214). The personal computer host then initiates the corresponding electronic device application programs to execute electronic device function (S216).

Thus, the invention an apparatus and a method for integrating personal computer and electronic device functions, integrating personal computer hardware with modified operation system and application programs to accomplish personal computer functions and electronic device function at the same time. The personal computer can maintain normal functions and, at the same time, enables electronic device function with the integrated interface.

While the invention has been described by way of example and in terms of the preferred embodiments, it is to be understood that the invention is not limited to the disclosed embodiments. To the contrary, it is intended to cover various modification and similar arrangements (as would be apparent to those skilled in the art). Therefore, the scope of the appended claims should be accorded the broadest interpretation so as to encompass all such modifications and similar arrangements.

What is claimed is:

1. An apparatus for integrating personal computer and electronic device functions, comprising:

integrated keyboard, comprising a personal computer function hot key and a plurality of electronic device function hot keys, the personal computer function hot key enabling personal computer mode and providing personal computer functions and electronic device function hot keys enabling electronic device mode and providing electronic device function;

a personal computer host, comprising a customized BIOS and a plurality of electronic device application programs, the customized BIOS executing power-up procedures when in electronic device mode, and electronic device application programs for executing electronic device function when in electronic device mode;

a keyboard encoder, coupled with the personal computer host and the integrated keyboard, producing a corresponding code according to the hot key used and sending the corresponding code to the personal computer host.

2. The apparatus for integrating personal computer and electronic device functions as claimed in claim 1, wherein the integrated keyboard, electronic device function hot keys are enabled by adding dedicated function keys to a standard keyboard layout.

3. The apparatus for integrating personal computer and electronic device functions as claimed in claim 1, wherein in the personal computer host, electronic device application programs execute corresponding electronic device functions according to the hot key used and registered by the keyboard encoder.

4. The apparatus for integrating personal computer and electronic device functions as claimed in claim 2, wherein in the integrated keyboard, electronic device function hot keys are enabled by assigning functionality to existing keys on a standard keyboard.

5. The apparatus for integrating personal computer and electronic device functions as claimed in claim 3, wherein in the personal computer host, electronic device application programs are enabled by computer-executable program language.

6. A method for integrating personal computer and electronic device functions, comprising:

providing an integrated keyboard, personal computer host, and keyboard encoder, the integrated keyboard comprising a personal computer function hot key and a plurality of electronic device function hot keys, the personal computer host comprising a customized BIOS and a plurality of electronic device application programs for executing personal computer functions and electronic device function, and the keyboard encoder coupled with the personal computer host and the integrated keyboard, for producing corresponding code according to hot keys used;

the keyboard encoder producing code corresponding to the hot key used and sending the corresponding code to the personal computer host;

the personal computer host determining whether the hot key used is the personal computer function hot key or electronic device function hot key according to the corresponding code;

the personal computer host entering personal computer mode and executing personal computer functions if the hot key used is the personal computer function hot key; and the personal computer host entering electronic device mode and initiating electronic device application programs to execute electronic device function if the hot key used is one of the plurality of electronic device function hot keys.

7. The method for integrating personal computer and electronic device functions as claimed in claim 6, wherein the integrated keyboard, electronic device function hot keys are enabled by adding dedicated function keys to a standard keyboard layout.

8. The method for integrating personal computer and electronic device functions as claimed in claim 6, wherein the integrated keyboard, electronic device function hot keys are enabled by assigning functionality to existing keys on a standard keyboard.

9. The method for integrating personal computer and electronic device functions as claimed in claim 6, wherein in the personal computer host, electronic device application programs execute the corresponding electronic device functions according to the hot key used and registered by the keyboard encoder.

10. The method for integrating personal computer and electronic device functions as claimed in claim 6, wherein in the personal computer host, electronic device application programs are enabled by computer-executable program language.

* * * * *

EX PARTE REEXAMINATION CERTIFICATE (5896th)

United States Patent
Wu (10) Number: US 6,765,788 C1
(45) Certificate Issued: *Sep. 18, 2007

(54) METHOD AND APPARATUS FOR INTEGRATING PERSONAL COMPUTER AND ELECTRONIC DEVICE FUNCTIONS

(75) Inventor: Chia-Chuan Wu, Kaohslung (TW)

(73) Assignee: Mitac Technology Corp., Hsin-Chu Hsien (TW)

Reexamination Request:
No. 90/007,303, Nov. 15, 2004

Reexamination Certificate for:
Patent No.: 6,765,788
Issued: Jul. 20, 2004
Appl. No.: 10/352,676
Filed: Jan. 28, 2003

(*) Notice: This patent is subject to a terminal disclaimer.

(30) Foreign Application Priority Data

Nov. 12, 2002 (TW) ................................. 91133178

(51) Int. Cl.
*G06F 1/16* (2006.01)

(52) U.S. Cl. ............... 361/680; 312/223.2; 400/88; 715/854

(58) Field of Classification Search ........... 361/680; 345/172
See application file for complete search history.

(56) References Cited

U.S. PATENT DOCUMENTS

| | | | |
|---|---|---|---|
| 5,446,904 A | 8/1995 | Belt et al. | |
| 5,551,033 A | 8/1996 | Foster et al. | |
| 5,613,135 A | 3/1997 | Sakai et al. | |
| 5,715,464 A | 2/1998 | Crump et al. | |
| 5,752,044 A | 5/1998 | Crump et al. | |
| 5,754,798 A | 5/1998 | Uehara et al. | |
| 5,758,174 A | 5/1998 | Crump et al. | |
| 5,765,004 A | 6/1998 | Foster et al. | |
| 5,854,624 A * | 12/1998 | Grant | 345/169 |
| 5,881,318 A | 3/1999 | Liebenow | |
| 5,881,381 A | 3/1999 | Yamashita et al. | |
| 5,884,085 A | 3/1999 | Sakai et al. | |
| 5,903,766 A | 5/1999 | Walker et al. | |
| 5,905,914 A | 5/1999 | Sakai et al. | |
| 5,986,586 A * | 11/1999 | Tsai | 341/22 |
| 5,999,994 A | 12/1999 | Wakeland et al. | |
| 6,081,752 A | 6/2000 | Benson, IV et al. | |
| 6,115,813 A * | 9/2000 | Hobson et al. | 713/1 |
| 6,170,024 B1 | 1/2001 | Wakeland et al. | |
| 6,223,293 B1 | 4/2001 | Foster et al. | |
| 6,266,714 B1 | 7/2001 | Jacobs et al. | |
| 6,301,673 B1 | 10/2001 | Foster et al. | |
| 6,349,386 B1 | 2/2002 | Chan | |
| 6,360,327 B1 * | 3/2002 | Hobson | 713/300 |

(Continued)

FOREIGN PATENT DOCUMENTS

| | | |
|---|---|---|
| CN | 1182930 | 5/1998 |
| CN | 1315685 | 10/2001 |
| JP | 10-111746 | 4/1998 |

(Continued)

OTHER PUBLICATIONS

Livingston et al., "More Windows 98 Secrets", IDG Books, published 1999, entire Chapter 22 "Power Management", pp. 623–635.*

Author Unknown; "FKB–8811 Multimedia Keyboard Specification.doc Issue 5.0"; Created Jul. 2002; pp. 1–3.

Author Unknown; "FKB–8811 Multimedia Keyboard Specification .doc Issue 3.0"; Created Sep. 2000; pp. 1–3.

Author Unknown; "LINDY Multimedia Keyboard User Manual Hotkey Driver Installation, First Edition"; Feb. 2001; pp. 1.

*Primary Examiner*—Majid A. Banankhah (57) ABSTRACT

An apparatus and a method for integrating personal computer and electronic device functions. An integrated keyboard, personal computer host, and keyboard encoder in turn integrate hardware, operating system, and application programs to provide personal computer and electronic device functions at the same time.

U.S. PATENT DOCUMENTS

| | | | |
|---|---|---|---|
| 6,378,068 B1 | 4/2002 | Foster et al. | |
| 6,414,675 B1 | 7/2002 | Shen | |
| 6,509,911 B1 * | 1/2003 | Shimotono | 715/761 |
| 6,529,145 B1 * | 3/2003 | Lin | 341/22 |
| 6,681,335 B1 | 1/2004 | Rice et al. | |
| 6,691,234 B1 * | 2/2004 | Huff | 713/300 |
| 6,725,384 B1 * | 4/2004 | Lambino et al. | 713/320 |
| 6,832,311 B2 * | 12/2004 | Morisawa | 713/1 |
| 2002/0070924 A1 * | 6/2002 | Petersen | 345/172 |
| 2002/0181192 A1 * | 12/2002 | Huang et al. | 361/683 |
| 2003/0063071 A1 * | 4/2003 | Wyatt | 345/172 |
| 2003/0093658 A1 | 5/2003 | Wen et al. | |

FOREIGN PATENT DOCUMENTS

| | | |
|---|---|---|
| JP | 10-111748 | 4/1998 |
| JP | 2000-242395 | 9/2000 |
| JP | 2002-91634 | 3/2002 |
| JP | 2003-150379 | 5/2003 |
| TW | 399168 | 9/1986 |
| TW | 510557 | 8/1987 |
| TW | 432275 | 3/1988 |
| TW | 444180 | 6/1988 |
| TW | 572277 | 4/1990 |
| TW | 571200 | 8/1991 |
| TW | 130953 | 4/1998 |
| TW | 153475 | 11/1998 |
| TW | 136044 | 3/1999 |
| TW | 118549 | 5/1999 |
| TW | 143010 | 6/1999 |
| TW | 196473 | 6/1999 |
| TW | 217205 | 9/1999 |
| TW | 375301 | 11/1999 |
| TW | 194895 | 9/2000 |
| TW | 462011 | 11/2001 |

* cited by examiner

US 6,765,788 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 6 are determined to be patentable as amended.

Claims 2–5 and 7–10, dependent on an amended claim, are determined to be patentable.

New claims 11–19 are added and determined to be patentable.

1. An apparatus for integrating personal computer and electronic device functions, comprising:
   an integrated keyboard, comprising a personal computer function hot key and a plurality of electronic device function hot keys, the personal computer function hot key enabling personal computer mode and providing personal computer functions and electronic device function hot keys enabling electronic device mode and providing electronic device function, *wherein the electronic device function is a multimedia function*;
   a personal computer host, comprising a customized BIOS and a plurality of electronic device application programs, the customized BIOS executing power-up procedures when in electronic device mode, and electronic device application programs for executing electronic device function when in electronic device mode, *at least one aspect of the power-up procedures in the electronic device mode being distinct from power-up procedures associated with the personal computer mode and enabling execution of the electronic device function in response to selection of at least one of the electronic device function hot keys from an off mode;* and
   a keyboard encoder, coupled with the personal computer host and the integrated keyboard, producing a corresponding code according to the hot key used and sending the corresponding code to the personal computer host.

6. A method for integrating personal computer and electronic device functions, comprising:
   providing an integrated keyboard, personal computer host, and keyboard encoder, the integrated keyboard comprising a personal computer function hot key and a plurality of electronic device function hot keys, the personal computer host comprising a customized BIOS and a plurality of electronic device application programs for executing personal computer functions and electronic device function, *wherein the electronic device function is a multimedia function*, and the keyboard encoder coupled with the personal computer host and the integrated keyboard, for producing corresponding code according to hot keys used;
   the keyboard encoder producing code corresponding to the hot key used and sending the corresponding code to the personal computer host;
   the personal computer host determining whether the hot key used is the personal computer function hot key or electronic device function hot key according to the corresponding code;
   the personal computer host entering personal computer mode and executing personal computer functions if the hot key used is the personal computer function hot key; and
   the personal computer host entering electronic device mode and initiating electronic device application programs to execute electronic device function if the hot key used is one of the plurality of electronic device function hot keys, *the customized BIOS executing power-up procedures in the electronic device mode, at least one aspect of the power-up procedures being distinct from power-up procedures associated with the personal computer mode and enabling execution of the electronic device function in response to selection of at least one of the electronic device function hot keys from an off mode.*

*11. The apparatus of claim 1, wherein the personal computer host is configured to initiate the customized BIOS and enter the electronic device mode, when the personal computer host receives code from the keyboard encoder corresponding to at least one of the electronic device function hot keys.*

*12. The apparatus of claim 1, wherein the personal computer host is configured to enter power-up mode, initiate the customized BIOS, and enter the electronic device mode when the personal computer host receives code from the keyboard encoder corresponding to at least one of the electronic device function hot keys.*

*13. The method of claim 6, wherein the personal computer host initiates the customized BIOS and enters the electronic device mode, when the hot key used is at least one of the plurality of the electronic device function hot keys.*

*14. The method of claim 6, wherein the personal computer host initiates the customized BIOS and enters the electronic device mode when the hot key used is at least one of the plurality of the electronic device function hot keys.*

*15. The method of claim 6, wherein the personal computer host enters a power-up mode, initiates the customized BIOS, and enters the electronic device mode when the hot key used is at least one of the plurality of electronic device function hot keys.*

*16. An apparatus for integrating personal computer and electronic device functions, comprising:*
   *an integrated keyboard, comprising a personal computer function hot key and a plurality of electronic device function hot keys, the personal computer function hot key enabling personal computer mode and providing personal computer functions and electronic device function hot keys enabling electronic device mode and providing electronic device function, wherein the electronic device function is a multimedia function;*
   *a personal computer host, comprising a customized BIOS and a plurality of electronic device application programs, the customized BIOS executing power-up procedures when in electronic device mode, and electronic device application programs for executing electronic device function when in electronic device mode, at least one aspect of the power-up procedures in the electronic device mode being distinct from power-up* procedures associated with the personal computer mode and enabling execution of the electronic device function in response to selection of at least one of the electronic device function hot keys from an off mode; and a keyboard encoder, coupled with the personal computer host and the integrated keyboard, producing a corresponding code according to the hot key used and sending the corresponding code to the personal computer host, wherein the personal computer host is configured to enter a power-up mode, initiate the customized BIOS, and enter the electronic device mode in response to receiving code from the keyboard encoder corresponding to selection of at least one of the electronic device function hot keys.

17. A method for integrating personal computer and electronic device functions, comprising:

providing a personal computer host including a customized BIOS that is customized to perform power up procedures when in an electronic device mode that is enabled via a hot key included on an integrated keyboard connected to the personal computer host;

producing, by a keyboard encoder, code corresponding to a hot key selected on the integrated keyboard when the personal computer host is in an off mode, and providing the corresponding code to the personal computer host;

entering, by the personal computer host, power-up mode in response to receiving the corresponding code;

determining, by the personal computer host, whether the selected hot key is a personal computer function hot key or an electronic device function hot key according to the corresponding code;

if the selected hot key is a personal computer function hot key,
    entering, by the personal computer host, a personal computer mode and executing personal computer functions; and if the selected hot key is an electronic device function hot key,
    entering, by the personal computer host, the electronic device mode, initiating the customized BIOS such that the customized BIOS performs the power-up procedures associated with the electronic device mode, and initiating an electronic device application program to execute an electronic device function that is a multimedia function, wherein at least one aspect of the power-up procedures in the electronic device mode being distinct from power-up procedures associated with the personal computer mode and enabling execution of the electronic device function in response to the selection of the electronic device function hot key from an off mode.

18. A system for integrating personal computer and electronic device functions, comprising:

an integrated keyboard, comprising a personal computer function hot key and a plurality of electronic device function hot keys, the personal computer function hot key enabling personal computer mode and providing personal computer functions and electronic device function hot keys enabling a power up of the system and enabling electronic device mode to provide electronic device function, wherein the electronic device function is a multimedia function;

a personal computer host, comprising a customized BIOS and a plurality of electronic device application programs, the personal computer host powering up from an off and initiating the customized BIOS to execute power-up procedures, when at least one of the electronic device function hot keys are selected to enable electronic device mode, and the electronic device application programs execute electronic device function when in electronic device mode, at least one aspect of the power-up procedures in the electronic device mode being distinct from power-up procedures associated with the personal computer mode and enabling execution of the electronic device function in response to selection of the at least one of the electronic device function hot keys from the off mode; and a keyboard encoder, coupled with the personal computer host and the integrated keyboard, producing a corresponding code according to the hot key used and sending the corresponding code to the personal computer host.

19. A method for integrating personal computer and electronic device functions, comprising:

providing an integrated keyboard comprising a personal computer function hot key and a plurality of electronic device function hot keys;

providing a personal computer host in an off mode and comprising a customized BIOS and a plurality of electronic device application programs for executing personal computer functions and electronic device function, wherein the electronic device function is a multimedia function;

providing a keyboard encoder coupled with the personal computer host and the integrated keyboard, for producing code corresponding to the hot key used and sending the corresponding code to the personal computer host;

sending by the keyboard encoder to the personal computer host code corresponding to a selected hot key on the integrated keyboard;

determining whether the selected hot key used is the personal computer function hot key or an electronic device function hot key according to the corresponding code;

the personal computer host powering up from the off mode, entering personal computer mode, and executing personal computer functions, if the hot key used is the personal computer function hot key; and the personal computer host powering up from the off mode, initiating the customized BIOS to perform power up procedures, and initiating an electronic device application program to execute an electronic device function, if the hot key used is one of the plurality of electronic device function hot keys, at least one aspect of the power-up procedures in the electronic device mode being distinct from power-up procedures associated with the personal computer mode and enabling execution of the electronic device function in response to selection of the at least one of the electronic device function hot keys from the off mode.

* * * * *

(12) INTER PARTES REEXAMINATION CERTIFICATE (711th)
United States Patent
Wu (10) Number: US 6,765,788 C2
(45) Certificate Issued: *Oct. 23, 2013

(54) METHOD AND APPARATUS FOR INTEGRATING PERSONAL COMPUTER AND ELECTRONIC DEVICE FUNCTIONS

(75) Inventor: Chia-Chuan Wu, Kaohslung (TW)

(73) Assignee: Getac Technology Corporation, Taipei (TW)

Reexamination Request:
No. 95/000,254, May 30, 2007

Reexamination Certificate for:
Patent No.: 6,765,788
Issued: Jul. 20, 2004
Appl. No.: 10/352,676
Filed: Jan. 28, 2003

Reexamination Certificate C1 6,765,788 issued Sep. 18, 2007

( * ) Notice: This patent is subject to a terminal disclaimer.

(30) Foreign Application Priority Data

Nov. 12, 2002 (TW) ................................ 91133178 A (51) Int. Cl.
*G06F 1/16* (2006.01)
*G06F 15/02* (2006.01)
*G06F 3/00* (2006.01)
*G06F 3/023* (2006.01)
*G06F 19/00* (2011.01)

(52) U.S. Cl.
USPC ...................... 361/679.08; 312/223.2; 400/88; 715/854

(58) Field of Classification Search
None
See application file for complete search history.

(56) References Cited

To view the complete listing of prior art documents cited during the proceeding for Reexamination Control Number 95/000,254, please refer to the USPTO's public Patent Application Information Retrieval (PAIR) system under the Display References tab.

*Primary Examiner* — Majid A. Banankhah (57) ABSTRACT

An apparatus and a method for integrating personal computer and electronic device functions. An integrated keyboard, personal computer host, and keyboard encoder in turn integrate hardware, operating system, and application programs to provide personal computer and electronic device functions at the same time.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-19 are cancelled.

\* \* \* \* \*